(12) United States Patent
Smith (10) Patent No.: US 9,212,691 B2
(45) Date of Patent: Dec. 15, 2015

(54) CROSS BLADE FLEXURE PIVOT AND METHODS OF USE THEREOF

(71) Applicant: C-FLEX BEARING CO., INC., Frankfort, NY (US)

(72) Inventor: Wayne A. Smith, Holland Patent, NY (US)

(73) Assignee: C-FLEX BEARING CO., INC., Frankfort, NY (US)

( * ) Notice: Subject to any disclaimer, the term of this patent is extended or adjusted under 35 U.S.C. 154(b) by 166 days.

(21) Appl. No.: 13/799,728

(22) Filed: Mar. 13, 2013

(65) Prior Publication Data

US 2013/0308997 A1    Nov. 21, 2013

Related U.S. Application Data

(60) Provisional application No. 61/647,627, filed on May 16, 2012.

(51) Int. Cl.
*F16F 1/18* (2006.01)
*F16C 11/12* (2006.01)

(52) U.S. Cl.
CPC ............ *F16C 11/12* (2013.01); *F16C 2220/04* (2013.01); *F16C 2220/20* (2013.01); *F16C 2300/02* (2013.01); *Y10T 403/32606* (2015.01)

(58) Field of Classification Search
CPC .. F16C 11/12; F16C 2220/20; F16C 2220/04; F16C 2300/02; Y10T 403/54; Y10T 403/32606; F16B 2/02; F16D 3/005; F16D 3/76; F16F 1/02
USPC ............ 267/160, 158, 161; 74/5 F; 248/565, 248/567, 590; 403/291; 29/436; 464/87, 88, 464/91, 92, 106, 147, 180, 185
See application file for complete search history.

(56) References Cited

U.S. PATENT DOCUMENTS

| | | | |
|---|---|---|---|
| 2,931,092 A | 4/1960 | Humphrey | |
| 3,073,584 A | 1/1963 | Troeger | |
| 3,142,888 A | 8/1964 | Troeger | |
| 3,181,851 A | 5/1965 | Troeger | |
| 3,181,918 A | 5/1965 | Troeger | |
| 3,188,071 A | 6/1965 | Owen | |
| 3,252,696 A | 5/1966 | Friedel | |
| 3,277,555 A | 10/1966 | Kutash | |
| 3,319,951 A | 5/1967 | Seelig | |
| 3,465,997 A * | 9/1969 | Piske | 248/619 |
| 3,807,029 A | 4/1974 | Troeger | |
| 3,813,089 A | 5/1974 | Troeger | |
| 3,825,992 A | 7/1974 | Troeger | |
| 4,261,211 A * | 4/1981 | Haberland | 74/5 F |

(Continued)

*Primary Examiner* — Pamela Rodriguez
(74) *Attorney, Agent, or Firm* — Heslin Rothenberg Farley & Mesiti P.C.; Andrew K. Gonsalves, Esq.

(57) ABSTRACT

The present invention relates to a device that can be used as, inter alia, a cross blade flexure pivot, with the cross blade flexure pivot comprising a monolithic structure. The present invention also relates to a method for preparing a monolithic cross blade flexure pivot using injection molding. Also provided is a mold for use in this injection molding method. The present invention also relates to a method for preparing a monolithic cross blade flexure pivot using selective laser sintering, as well as to the three-dimensional digital descriptions used in this method. The present invention also relates to a method of providing non-frictional rotational support to a mechanical component. The present invention also relates to systems that include the cross blade flexure pivot device.

21 Claims, 10 Drawing Sheets

(56) References Cited

U.S. PATENT DOCUMENTS

| | | | |
|---|---|---|---|
| 4,405,184 A * | 9/1983 | Bahiman | 403/291 |
| 4,637,596 A * | 1/1987 | Lewis | 267/160 |
| 5,620,169 A * | 4/1997 | Payne | 267/160 |
| 6,146,044 A * | 11/2000 | Calvet | 403/119 |
| 6,267,363 B1 * | 7/2001 | Genequand et al. | 267/161 |
| 6,479,782 B1 | 11/2002 | Blackburn | |
| 6,666,612 B2 * | 12/2003 | Lorigny et al. | 403/291 |
| 8,899,869 B2 * | 12/2014 | Valois | 403/291 |

\* cited by examiner

CROSS BLADE FLEXURE PIVOT AND METHODS OF USE THEREOF

CROSS-REFERENCE TO RELATED APPLICATIONS

This application claims priority benefit of U.S. Provisional Patent Application Ser. No. 61/647,627, filed May 16, 2012, the disclosure of which is hereby incorporated by reference herein in its entirety.

FIELD OF THE INVENTION

The present invention relates to a device for use as, inter alia, a cross blade flexure pivot. The present invention also relates to methods of making the device. The present invention further relates to methods of using the device. The present invention also relates to systems that include the cross blade flexure pivot device of the present invention.

BACKGROUND OF THE INVENTION

A cross blade flexure pivot is a device that provides for well defined rotational movement about an axis of revolution in response to an external force. Most of these devices are manufactured from multiple metal components, which are welded or brazed together or machined from a piece of metal, resulting in relatively expensive manufacturing procedures.

There is a need in the art for a method and means for more economically producing cross blade flexure pivots. Further, there is a need in the art for a method of manufacturing cross blade flexure pivots whereby numerous variations of a standard design can be easily and economically produced.

The present invention is directed to overcoming these and other deficiencies in the art.

SUMMARY OF THE INVENTION

In one aspect, the present invention relates to a cross blade flexure pivot comprising a monolithic structure. The monolithic structure includes a top platform and a bottom platform, each of which has an inner surface, where the inner surface of the top platform and the inner surface of the bottom platform face one another and are substantially parallel to one another. The monolithic structure also includes at least one pair of crossing flat flexure elements. The at least one pair of crossing flat flexure elements function as springs and intersect independent of one another to provide an axis of rotation for the top and bottom platforms along a projected line that extends through the intersection of the pair of crossing flat flexure elements. The first flexure element of the pair of flexure elements extends from a first end of the inner surface of the top platform to an opposite second end of the inner surface of the bottom platform. The second flexure element of the pair of flexure elements extends from a second end of the inner surface of the top platform to an opposite first end of the inner surface of the bottom platform.

In one embodiment, the cross blade flexure pivot of the present invention further includes a mounting support. The mounting support includes a projection that extends downward from a side of the top platform so that the inner surface of the mounting support faces the axis of rotation formed by the intersection of the pair of crossing flat flexure elements, and so that the projection extends at least beyond the axis of rotation.

In another embodiment, the cross blade flexure pivot of the present invention further includes a third flexure element that is substantially the same as the first flexure element in structure and orientation, where the second flexure element is disposed between the first and third flexure elements.

In another aspect, the present invention relates to a method for preparing a monolithic cross blade flexure pivot using injection molding. This method involves providing a mold configured to form, by injection molding, a cross blade flexure pivot of the present invention. The method also involves injecting molding material into the mold under conditions effective to yield the monolithic cross blade flexure pivot.

In a further aspect, the present invention relates to a mold for preparing, by injection molding techniques, a cross blade flexure pivot according to the present invention.

In another aspect, the present invention relates to a method for preparing a monolithic cross blade flexure pivot using selective laser sintering. This method involves providing a three-dimensional digital description of a monolithic cross blade flexure pivot according to the present invention. This method also involves performing selective laser sintering (SLS) to produce the monolithic cross blade flexure pivot according to the three-dimensional digital description.

In another aspect, the present invention relates to a three-dimensional digital description that is effective for use in producing, by selective laser sintering (SLS), a monolithic cross blade flexure pivot according to the present invention.

In yet another aspect, the present invention relates to a method of providing non-frictional rotational support to a mechanical component. This method involves providing a monolithic cross blade flexure pivot according to the present invention. This method also involves functionally mounting the monolithic cross blade flexure pivot to a mechanical component so that the mechanical component pivots from a starting position to an ending position in response to an applied force, and then returns to the starting position due to reverse torsional spring force generated by the monolithic cross blade flexure pivot.

In a further aspect, the present invention relates to systems that include the cross blade flexure pivot device of the present invention and at least one mechanical component functionally coupled to the device.

One object of the present invention is to provide a cross blade flexure pivot for providing a rotational support, with the pivot comprising a unitary structure suitable for manufacturing utilizing a process such as, but not limited to, plastic molding.

In various embodiments of the present invention, each cross blade flexure pivot can include an upper platform, a lower platform, a first flexure element, and a second flexure element. The first and second flexure elements can be separate from each other and formed in opposition, both connecting to the upper and lower platforms.

In various embodiments of the present invention, two or more flexure elements can be utilized.

Further, in accordance with various embodiments of the present invention, the upper or lower platform can be formed with mounting or connecting means.

Compared to prior art designs of flexure pivots, the present invention maintains excellent torsional compliance while providing for stiffness in other axes perpendicular to AR in a design which is economical to produce and provides great freedom in the design of mounting and support features.

These and other objects, features, and advantages of this invention will become apparent from the following detailed description of the various aspects of the invention taken in conjunction with the accompanying drawings.

BRIEF DESCRIPTION OF THE DRAWINGS

For the purpose of illustrating aspects of the present invention, there are depicted in the drawings certain embodiments of the invention. However, the invention is not limited to the precise arrangements and instrumentalities of the embodiments depicted in the drawings. Further, as provided, like reference numerals contained in the drawings are meant to identify similar or identical elements.

As shown in FIG. 10, system 90 includes cross blade flexure pivot 1 having a bottom platform 30 that is fixed and mirror 92 that is attached to top platform 20. System 90 further includes a plate 94 (e.g., a metal plate) that is also attached to top platform 20 and that extends beyond the platform to a position over an adjacent electromagnet 96.

DETAILED DESCRIPTION OF THE INVENTION

The present invention relates to devices, systems, and methods that enable the production and use of cross blade flexure pivots having a monolithic structure. According to the present invention, because the cross blade flexure pivots are in the form of a monolithic structure, methods are also provided herein for preparing the monolithic cross blade flexure pivots using techniques such as injection molding and selective laser sintering. This approach is advantageous over the state of the art in that it allows for the efficient and cost-effective mass production of flexure pivots that can be used in a large number of applications.

Various embodiments of the present invention are described for illustrative purposes in the accompanying drawings. Certain elements in selected views of the drawings may be illustrated not-to-scale, for illustrative clarity. The structure, operation, and advantages of the present invention will become further apparent upon consideration of the following description taken in conjunction with the accompanying drawings.

Figure 8:
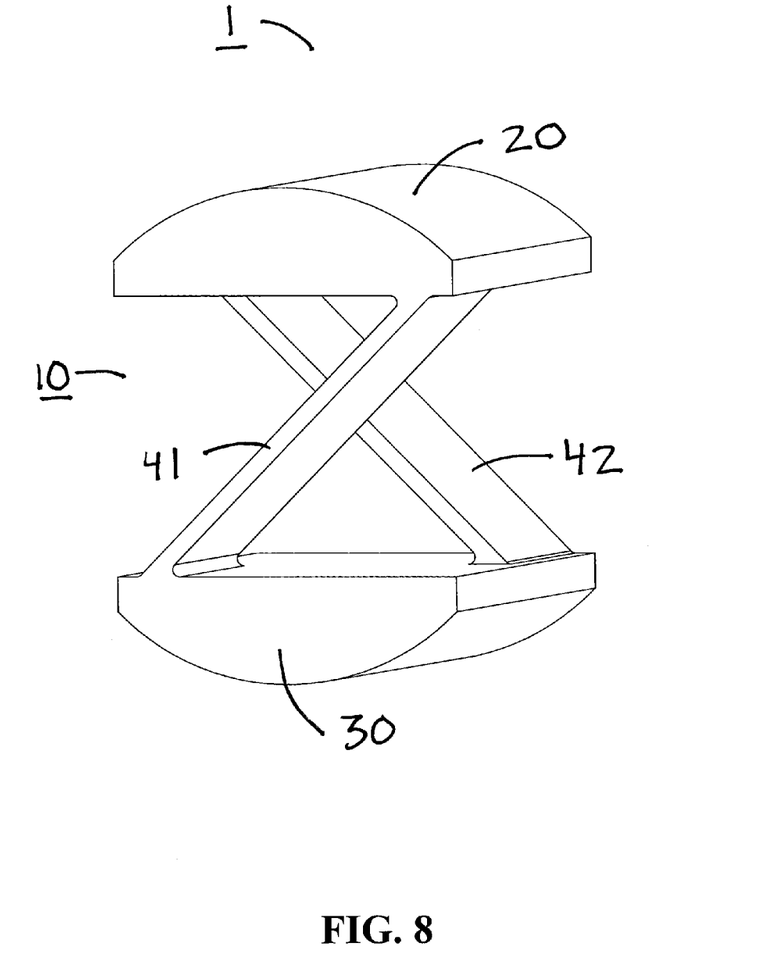
FIG. 8 is a perspective view of one embodiment of a cross blade flexure pivot of the present invention. In this embodiment, cross blade flexure pivot 1 is shown as having an arcuate top platform 20, an arcuate bottom platform 30, a first flexure element 41, and a second flexure element 42.
Figure 9:
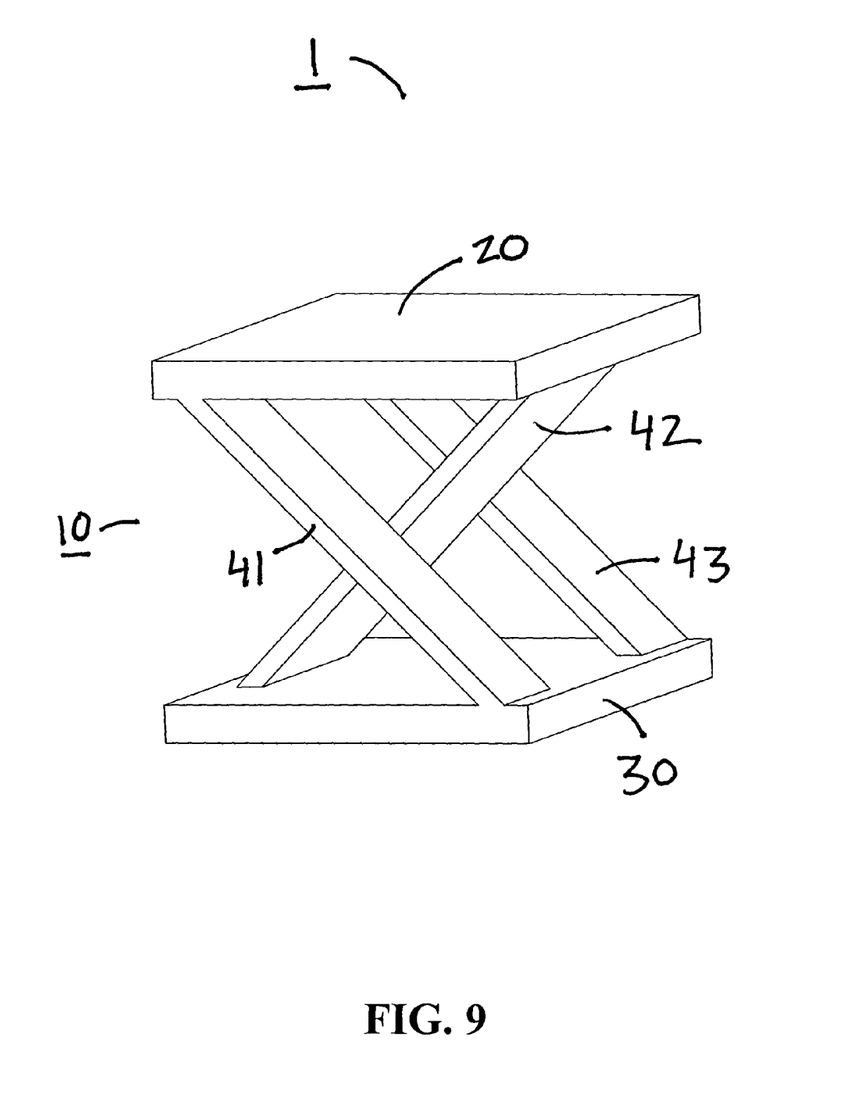
FIG. 9 is a perspective view of one embodiment of a cross blade flexure pivot of the present invention. In this embodiment, cross blade flexure pivot 1 is shown as having a top platform 20, a bottom platform 30, a first flexure element 41, a second flexure element 42, and a third flexure element 43.
Figure 10:
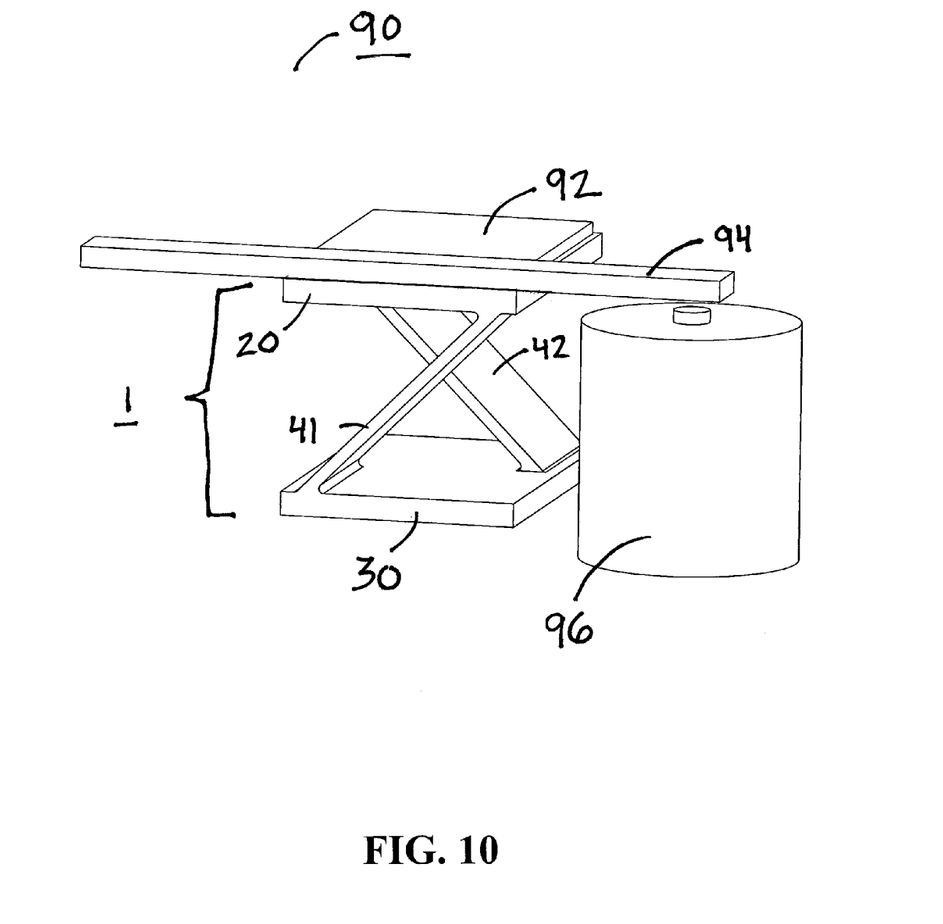
FIG. 10 is a perspective view of one embodiment of a system that includes a cross blade flexure pivot of the present invention. In this embodiment, the system is a mirror scanner.

FIGS. 1-9 illustrate various embodiments and aspects of the monolithic cross blade flexure pivot of the present invention. FIG. 10 illustrates one example of the use of a monolithic cross blade flexure pivot of the present invention.

Figure 1:
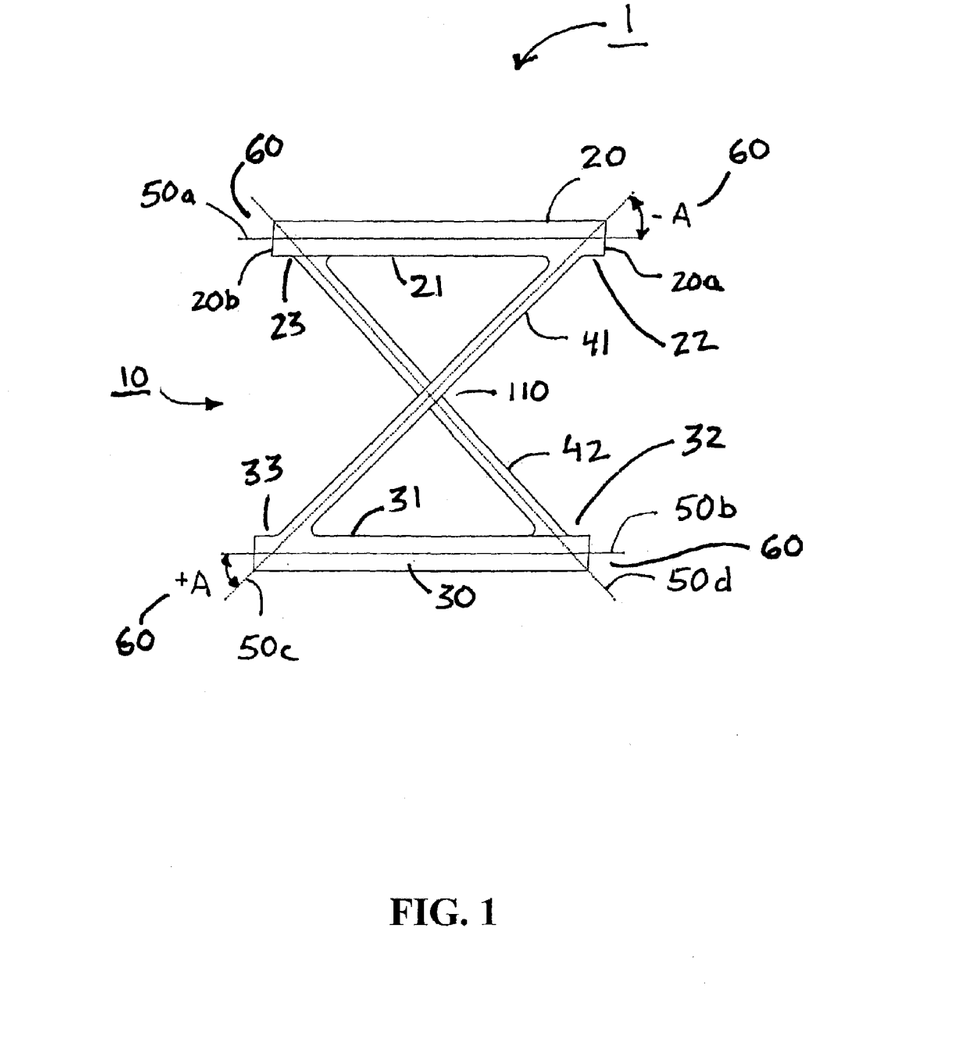
FIG. 1 is an end view of one embodiment of a cross blade flexure pivot of the present invention. Cross blade flexure pivot 1 is shown as having top platform 20, bottom platform 30, first flexure element 41, and second flexure element 42.
Figure 2:
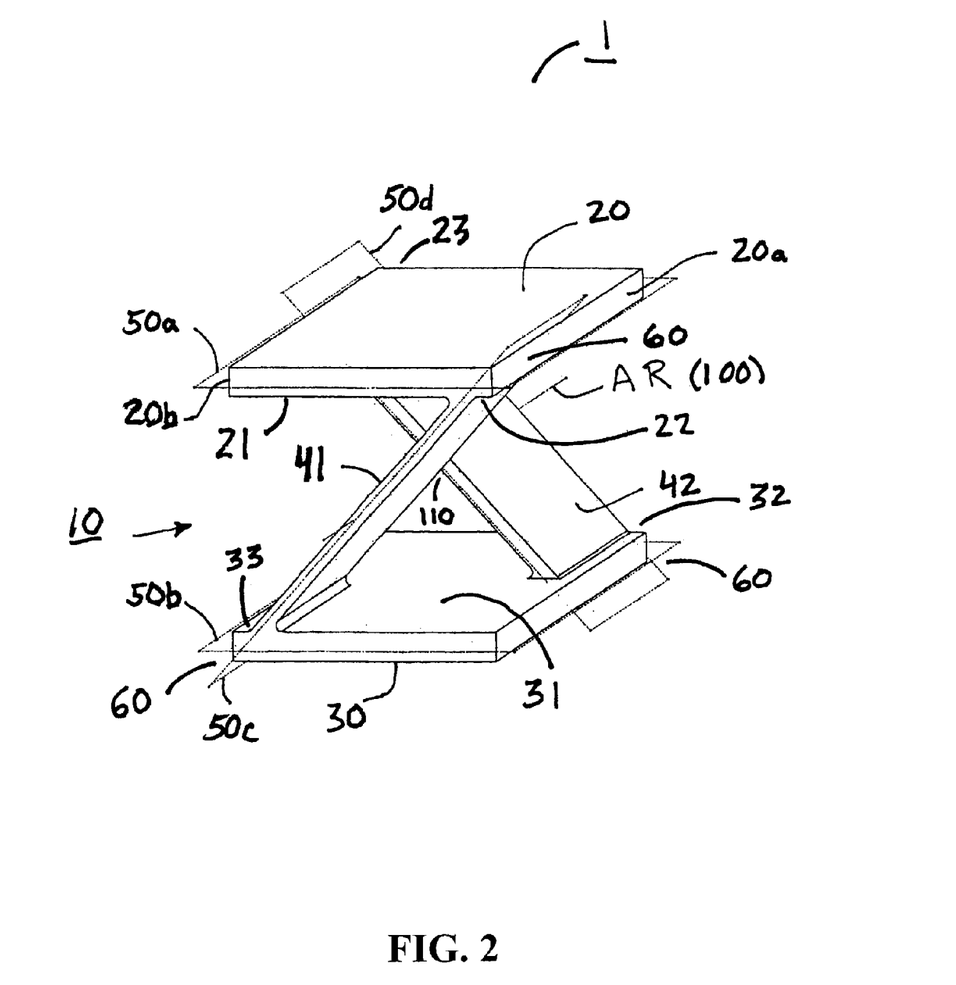
FIG. 2 is a perspective view of the embodiment of the cross blade flexure pivot of the present invention as shown in FIG. 1.

Referring to FIG. 1 and FIG. 2, there is set forth herein a cross blade flexure pivot 1 having a monolithic structure 10 that includes a top platform 20 and a bottom platform 30, each of which has an inner surface, where inner surface 21 of top platform 20 and inner surface 31 of bottom platform 30 face one another and are substantially parallel to one another. Monolithic structure 10 also includes at least one pair of crossing flat flexure elements (41, 42). The at least one pair of crossing flexure elements function as springs and intersect independent of one another to provide an axis of rotation 100 for the top (20) and bottom (30) platforms along a projected line that extends through the intersection 110 of the pair of crossing flat flexure elements. First flexure element 41 of the pair of flexure elements extends from first end 22 of inner surface 21 of top platform 20 to an opposite second end 33 of inner surface 31 of bottom platform 30. Second flexure element 42 of the pair of flexure elements extends from second end 23 of inner surface 21 of top platform 20 to an opposite first end 32 of inner surface 31 of bottom platform 30.

Angles 60 are formed between a central plane (50a, 50b) of either the top (20) or bottom (30) platform and a central plane (50c, 50d) of either the first (41) or second (42) flexure element. Suitable angles 60 can be an angle of greater than 0 degrees and less than 90 degrees. By way of example, in one embodiment, angle −A between central plane 50a of top platform 20 and central plane 50c of first flexure element 41 is more than zero degrees and less than 90 degrees, and angle +A between central plane 50b of bottom platform 30 and central plane 50c of first flexure element 41 is also more than zero degrees and less than 90 degrees. Similarly, the same angle ranges (i.e., more than zero degrees and less than 90 degrees) can be true for central plane 50d of second flexure element 42 and top and bottom platforms 20 and 30, respectively. In a particular embodiment, angle +A and angle −A can be +45 degrees and −45 degrees, respectively.

As shown in FIG. 2, AR depicts the axis of rotation 100 of cross blade flexure pivot 1 which, in its un-deflected form, passes through center plane 50c and 50d of the first and second flexure elements 41 and 42, respectively. Rigidly fixing bottom platform 30 and applying a force on face 20a or 20b of top platform 20 will result in a torsional deflection of top platform 20 about axis AR (100) since the structure of the pivot is compliant about axis AR (100). The pivot is structurally rigid in other axes lying perpendicular to AR (100).

Figure 3:
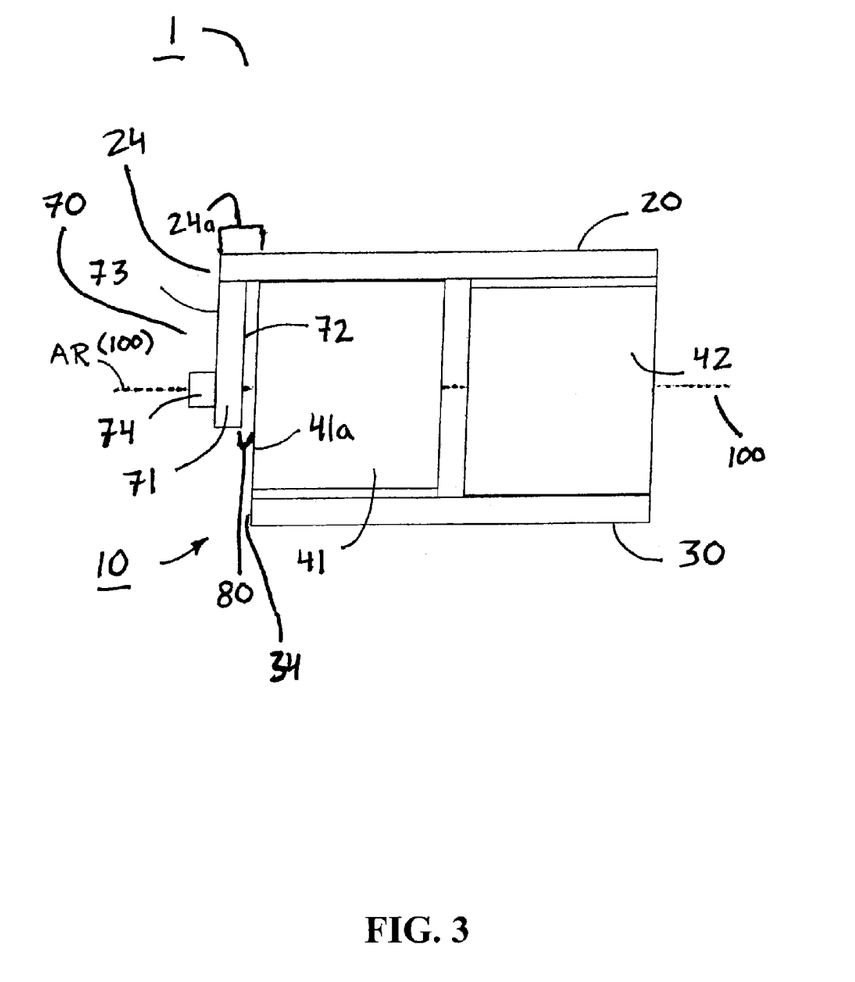
FIG. 3 is a side view of one embodiment of a cross blade flexure pivot of the present invention. In particular, the embodiment illustrated in FIG. 3 includes a mounting support 70 extending downwardly from top platform 20.
Figure 4:
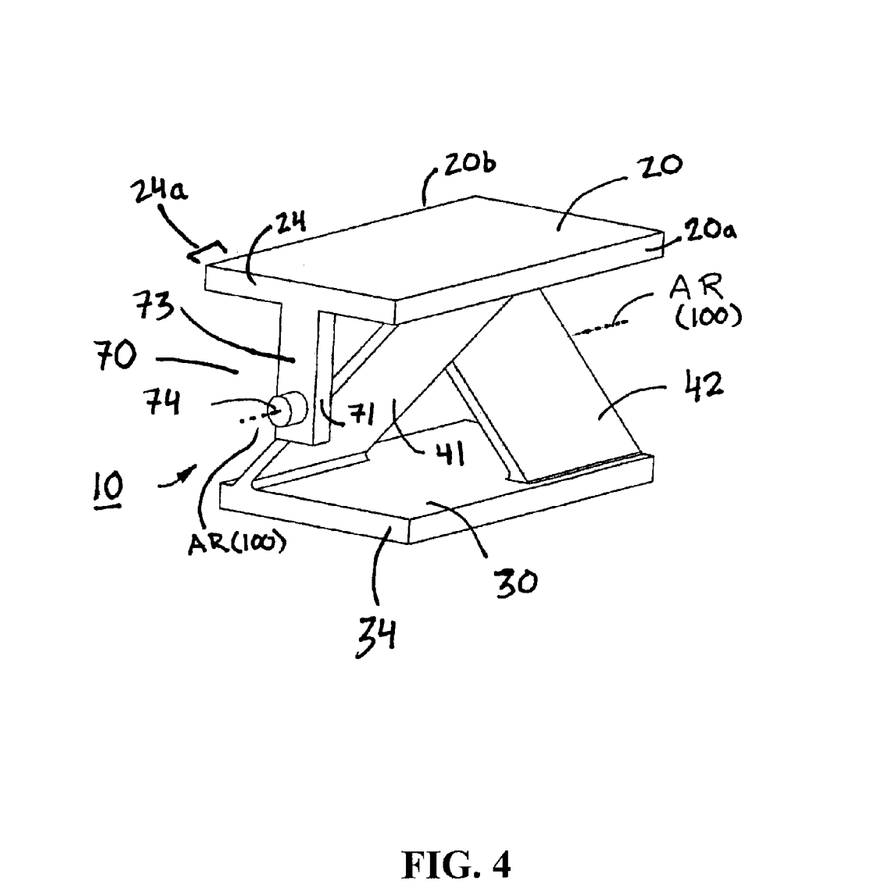
FIG. 4 is a perspective view of the embodiment of the cross blade flexure pivot of the present invention as show in FIG. 3.

Referring to FIG. 3 and FIG. 4, in one embodiment, cross blade flexure pivot 1 can further include mounting support 70. Mounting support 70 can comprise projection 71 that extends downward from side 24 of top platform 20 so that inner surface 72 of mounting support 70 faces axis of rotation 100 formed by the intersection of the pair of crossing flat flexure elements (41, 42), and so that projection 71 extends at least beyond axis of rotation 100.

In one embodiment, cross blade flexure pivot 1 is such that inner surface 72 of mounting support 70 is disposed a distance from the nearest flat flexure element (41) so as to form gap 80 therebetween. Gap 80 can be formed by providing top platform 20 having side 24a that extends beyond opposing side 34 of bottom platform 30, so that extending mounting support 70 downward from extended side 24a of top platform 20 results in gap 80.

Referring more particularly to FIG. 3 and FIG. 4, there is shown a cross blade flexure pivot 1 that is an embodiment of the present invention having a first and second flexure element 41 and 42, respectively, connecting to top and bottom platforms 20 and 30, respectively, and a support portion (mounting support 70) connected to top platform 20. The support portion (mounting support 70) has a cylindrical post 74 in line with the pivot axis of rotation (AR) (100). Cross blade flexure pivot 1 has a top platform 20 and a bottom platform 30 connected by a first flexure element 41 and a second flexure element 42. AR (100) depicts the axis of rotation of the cross blade flexure pivot 1. The extended side 24a of the top platform 20 extends beyond the end face 41a of the first flexure element 41.

A support structure (projection 71 of mounting support 70) extends downward from top platform 20 and has clearance between the back face (inner surface 72) of the support structure (mounting support 70) and end face 41a of the first flexure element 41. The support structure (projection 71 of mounting support 70) extends downward from top platform 20 some distance beyond AR (100). Post 74 (cylindrical in this illustrative embodiment, but not limited to such shape) extends outward from the end face (outward surface 73 of mounting support 70) of the support structure (projection 71 of mounting support 70) and is generally axially aligned with AR (100), though it need not be in all embodiments of the present invention.

Rigidly fixing bottom platform 30 and applying a load on face 20a or 20b will result in a torsional deflection of the top platform 20 about AR (100) since the structure of the pivot is compliant about AR. Cylindrical post 74, which is generally axially aligned with AR, will be caused to rotate about AR providing a mounting point to which an item requiring small amounts of rotary motion may be mounted.

Figure 5:
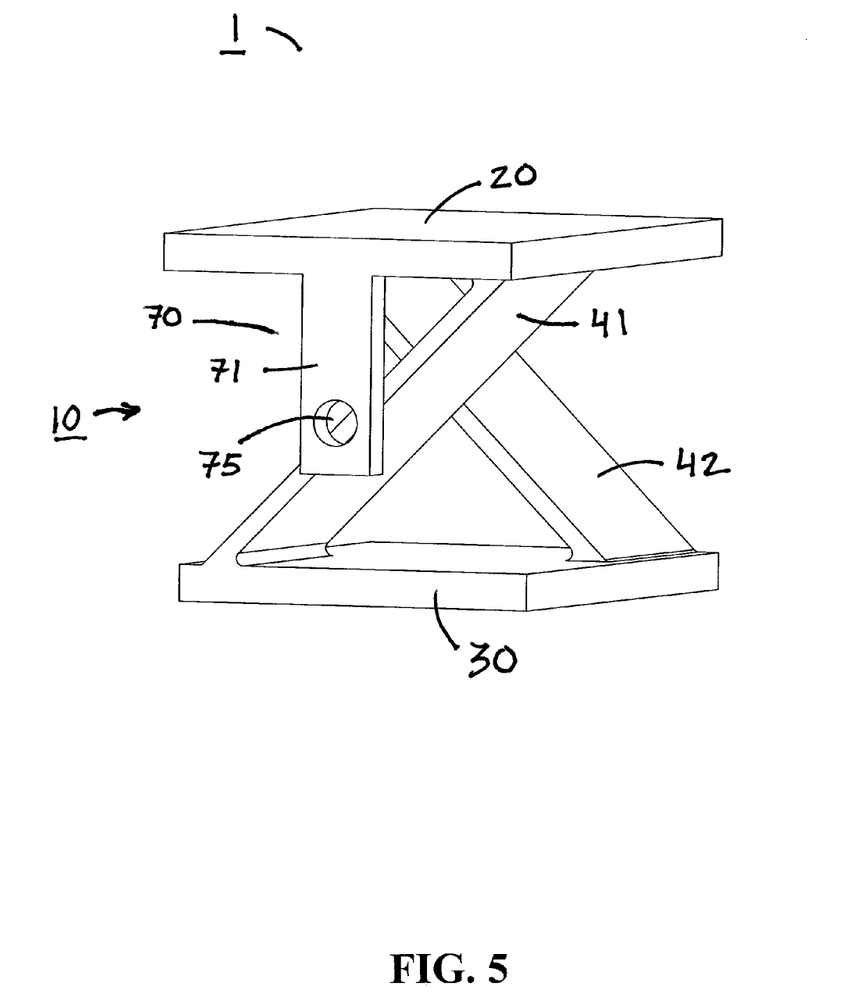
FIG. 5 is a perspective view of one embodiment of the cross blade flexure pivot of the present invention having a mounting support 70 that further includes hole 75 in projection 71 for inserting a separate post therethrough. In this embodiment, hole 75 is circular in shape.
Figure 6:
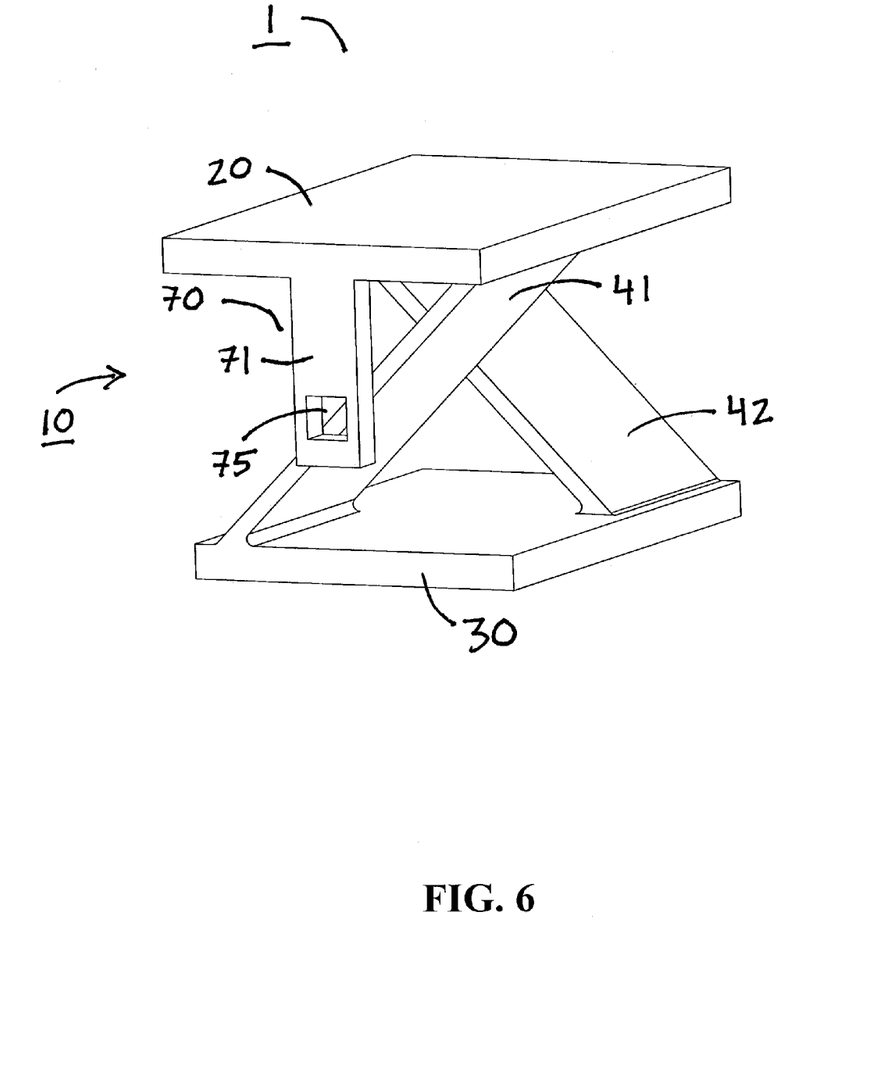
FIG. 6 is a perspective view of one embodiment of the cross blade flexure pivot of the present invention having a mounting support 70 that further includes hole 75 in projection 71 for inserting a separate post therethrough. In this embodiment, hole 75 is square in shape.

In another embodiment, the mounting support can further include a hole for inserting a separate post therethrough for mounting purposes, with the hole being disposed in a position aligned with the axis of rotation formed by the intersection of the pair of crossing flat flexure elements. For example, referring to FIG. 5 and FIG. 6, cross blade flexure pivot 1 can include mounting support 70, with mounting support 70 further including hole 75 for inserting a separate post therethrough for mounting purposes, with hole 75 being disposed in a position aligned with axis of rotation 100 formed by the intersection of the pair of crossing flat flexure elements (41, 42). FIG. 5 illustrates an embodiment with hole 75 of mounting support 70 being configured in a circular shape. FIG. 6 illustrates an embodiment with hole 75 of mounting support 70 being configured in a square shape. However, the present invention is not limited to mounting support holes of a particular shape, so that the present invention contemplates mounting support holes of any shape.

Figure 7:
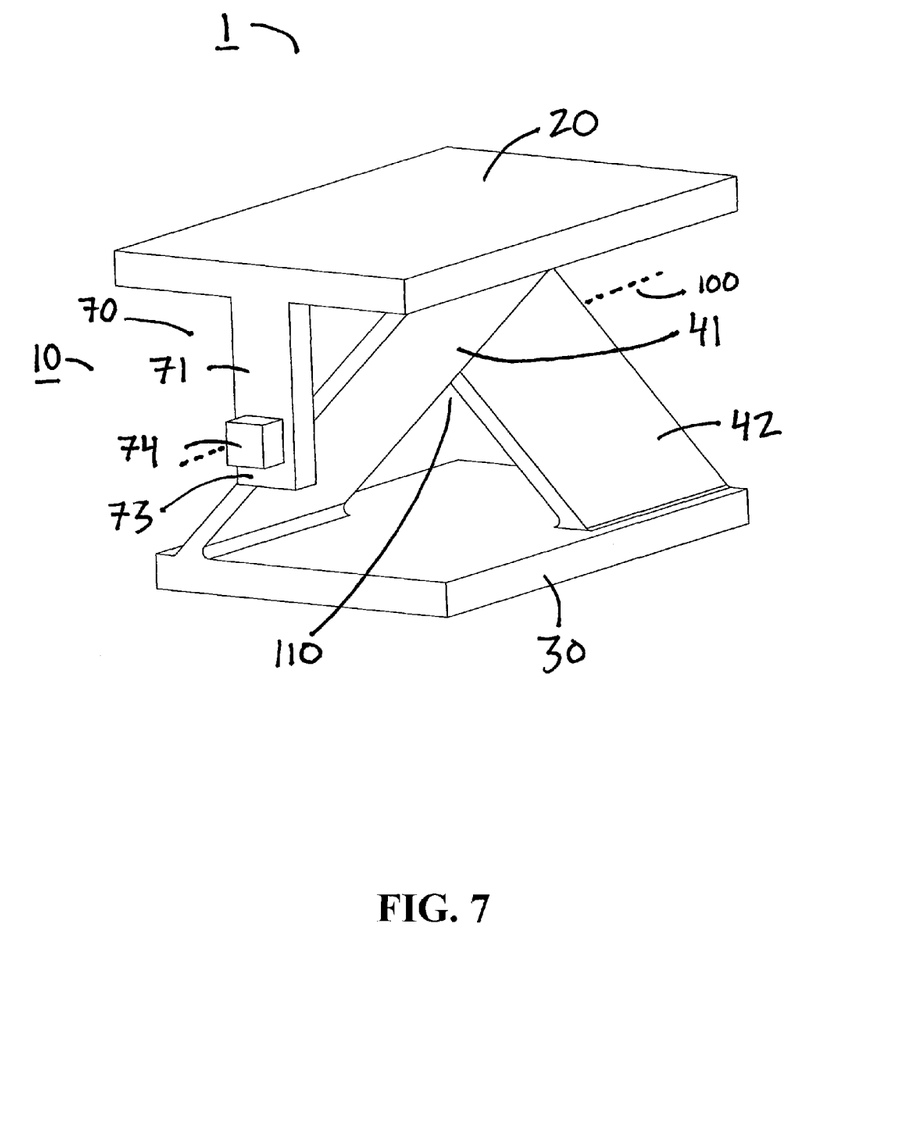
FIG. 7 is a perspective view of one embodiment of the cross blade flexure pivot of the present invention having a mounting support 70 that further includes post 74 extending outward from projection 71 for use in functional coupling with a separate component. In this embodiment, post 74 is square in shape.

In another embodiment, the mounting support can further include a post that extends outward from the outward surface of the mounting support. In a particular embodiment, the outward extending post can be aligned with the axis of rotation formed by the intersection of the pair of crossing flat flexure elements. For example, referring to FIG. 7, mounting support 70 can further include post 74 that extends outward from outward surface 73 of mounting support 70 (particularly from projection 71 of mounting support 70). In one embodiment, post 74 can be aligned with axis of rotation 100 formed by the intersection of the pair of crossing flat flexure elements (41, 42), though it need not be so aligned. The embodiment shown in FIG. 7 illustrates post 74 as being square in shape. However, the present invention is not limited to outwardly extending posts of the mounting support of a particular shape, so that the present invention contemplates mounting support outwardly extending posts of any shape.

The cross blade flexure pivot of the present invention can have top and bottom platforms of various surface configurations. For example, as shown in FIGS. 1-7, top platform 20 and bottom platform 30 are provided as flat surfaces. Turning to FIG. 8, the present invention also provides an embodiment of a cross blade flexure pivot 1 having an arcuate shaped top platform 20, an arcuate shaped bottom platform 30, first flexure element 41, and second flexure element 42. Therefore, as shown in FIGS. 1-8, the top and bottom platforms need not be flat surfaces and instead can be other shapes, such as, for example, arcuate shaped. Further, the present invention further contemplates that the top and bottom platforms need not be the same shaped configuration as one another. For example, the top platform can be flat while the bottom platform can be arcuate. The shape depends on the coupling requirements of the top and bottom platforms. Thus, if, for example, the bottom platform is to be fixed to a flat surface, then the likely configuration of the bottom platform would be a flat surface as well. Similarly, if the top platform will function to receive or fit into a circular space (e.g., a pipe or cylindrical structure), the top platform can be configured to have a complementary arcuate shape (e.g., as in FIG. 8).

As shown in FIGS. 1-4, cross blade flexure pivot 1 is such that monolithic structure 10 includes one pair of crossing flat flexure elements (41, 42). In other embodiments (not shown in FIGS. 1-4), the cross blade flexure pivot of the present invention can include a monolithic structure having more than one pair of crossing flat flexure elements. In still other embodiments, as shown in FIG. 9, the cross blade flexure pivot of the present invention can include a third flexure element that is substantially the same as the first flexure element in structure and orientation, with the second flexure element being disposed between the first and third flexure elements. Referring to FIG. 9, cross blade flexure pivot 1 includes top platform 20, bottom platform 30, first flexure element 41, second flexure element 42, and third flexure element 43, with first flexure element 41 and third flexure element 43 being substantially the same in structure and orientation, with second flexure element 42 being disposed between first flexure element 41 and third flexure element 43.

The cross blade flexure pivot of the present invention can be made of any material that can form a monolithic structure as described herein. Suitable materials for forming the monolithic structure can include, without limitation, plastic compositions and metallic compositions. Suitable plastic compositions can include, without limitation, DuPont Zytel, Delrin, Schulatec, Ryton, Vespel, polypropylene, nylon, Torlon, and the like. Suitable metallic compositions can include, without limitation, stainless steel, titanium, aluminum, carbon steel, nickel alloys, beryllium copper, and the like.

The cross blade flexure pivot of the present invention can be formed according to any dimension suitable for such pivot devices. Therefore, the dimensions of the cross blade flexure pivot of the present invention are not limited to any particular dimensions. In one embodiment, the cross blade flexure pivot of the present invention can have a height of 1 inch, a width of 1 inch, and a length of 1.5 inches. In other embodiments, the cross blade flexure pivot of the present invention can range in size from nano sizes (e.g., less than 0.010" high×0.010" wide×0.010" long) to macro sizes (e.g., larger than 12" high× 12" wide×12" long).

The cross blade flexure pivot of the present invention can be formed in order to meet the functional requirements (e.g., stiffness, load bearing capacity, etc.) for a particular application. For example, the length, thickness, and number of flat flexure elements used can be varied to specific requirements for rotational stiffness (e.g., torsional spring rate), load bearing capacity, and rotational capability. In general, thinner flexures can be used to accommodate light loads and would exhibit lower bending stresses during rotation of the upper platform, thereby allowing for high angles of rotation. By way of contrast, thicker flexures would allow for larger loads but would be restricted to lower angles of rotation.

In another aspect, the present invention relates to a method for preparing a monolithic cross blade flexure pivot using injection molding. This method involves providing a mold configured to form, by injection molding, a cross blade flexure pivot of the present invention. The molding material is injected into the mold under conditions effective to yield the monolithic cross blade flexure pivot. As set forth herein, plastic and metallic materials can be used as the molding material. Injection molding techniques known in the art suitable for plastic injection molding or metal injection molding processes can be used for making the monolithic cross blade flexure pivot of the present invention.

In a further aspect, the present invention relates to a mold for preparing, by injection molding techniques, a cross blade flexure pivot according to the present invention.

In another aspect, the present invention relates to a method for preparing a monolithic cross blade flexure pivot using selective laser sintering. This method involves providing a three-dimensional digital description of a monolithic cross blade flexure pivot according to the present invention. The three-dimensional digital description can then be used to perform selective laser sintering (SLS) to produce the monolithic cross blade flexure pivot of the present invention. The selective laser sintering process can use plastic particles to produce a monolithic cross blade flexure pivot that comprises a plastic composition. Suitable plastic compositions are as described herein. Alternatively, the selective laser sintering process can use metallic particles to produce a monolithic cross blade flexure pivot that comprises a metallic composition. Suitable metallic compositions are as described herein.

In another aspect, the present invention relates to a three-dimensional digital description that is effective for use in producing, by selective laser sintering (SLS), a monolithic cross blade flexure pivot according to the present invention.

In yet another aspect, the present invention relates to a method of providing non-frictional rotational support to a mechanical component. This method involves providing a monolithic cross blade flexure pivot according to the present invention. The monolithic cross blade flexure pivot is functionally mounted to a mechanical component so that the mechanical component pivots from a starting position to an ending position in response to an applied force, and then returns to the starting position due to reverse torsional spring force generated by the monolithic cross blade flexure pivot.

In various embodiments, the mechanical component is effective for various uses recognized in the art, including, without limitation, for use as switching mechanisms, oscillating mirror platforms, weigh scales, computer disc drive pickup arm supports, gimbal mount supports, gaging systems, balance beams, and the like.

Therefore, the present invention also provides systems and apparatuses that include a cross blade flexure pivot of the present invention functionally coupled to a mechanical component for a particular application.

Referring to FIG. 10, a mirror scanner is an example of one particular application and system that can use a cross blade flexure pivot of the present invention. As shown in FIG. 10, in system 90, bottom platform 30 would be fixed, and mirror 92 would be attached to top platform 20. Plate 94 (e.g., a metal plate) would also be attached to top platform 20 and would extend beyond the platform to a position over an adjacent electromagnet 96. When electromagnet 96 is activated it will pull metal plate 94 down and cause rotation of top platform 20 about the axis of rotation of pivot 1. When electromagnet 96 is de-activated, pivot 1, which acts as an energy storage device, would cause top platform 20 to rotate away from electromagnet 96 about the axis of rotation of pivot 1 in a frictionless manner according to the torsional spring rate of pivot 1 and the inertia of the mass being rotated until it passes the at rest or null position of pivot 1, beyond which point in its rotation, the reverse torsional spring rate gradually overcomes the rotational momentum of the system and rotation stops, then reverses back toward electromagnet 96. When top platform 20 and metal plate 94 rotate past the pivot null position, electromagnet 96 is again activated and the process begins again. Thus, as shown in FIG. 10, pivot 1 acts as an efficient energy storage device, requiring minimal energy input to begin and continue frictionless rotational movement.

In a further aspect, the present invention relates to systems that include the cross blade flexure pivot device of the present invention and at least one mechanical component functionally coupled to the device.

A small sample of embodiments of cross blade flexure pivots, methods of preparing cross blade flexure pivots, methods of using cross blade flexure pivots, and related apparatuses are described herein as follows:

A1. A cross blade flexure pivot comprising a monolithic structure, said monolithic structure comprising:
    a top platform and a bottom platform, each of which has an inner surface, wherein the inner surface of the top platform and the inner surface of the bottom platform face one another and are substantially parallel to one another; and
    at least one pair of crossing flat flexure elements that function as springs and that intersect independent of one another to provide an axis of rotation for the top and bottom platforms along a projected line that extends through the intersection of the pair of crossing flat flexure elements,
    wherein a first flexure element of the pair of flexure elements extends from a first end of the inner surface of the top platform to an opposite second end of the inner surface of the bottom platform, and
    wherein a second flexure element of the pair of flexure elements extends from a second end of the inner surface of the top platform to an opposite first end of the inner surface of the bottom platform.

A2. The cross blade flexure pivot according to A1, wherein an angle formed between a central plane of either the top or bottom platform and a central plane of either the first or second flexure element is an angle of greater than 0 degrees and less than 90 degrees.

A3. The cross blade flexure pivot according to A1 further comprising:
    a mounting support comprising a projection that extends downward from a side of the top platform so that the inner surface of the mounting support faces the axis of rotation formed by the intersection of the pair of crossing flat flexure elements, and so that the projection extends at least beyond the axis of rotation.

A4. The cross blade flexure pivot according to A3, wherein the inner surface of the mounting support is disposed a distance from the nearest flat flexure element so as to form a gap therebetween.

A5. The cross blade flexure pivot according to A4, wherein the gap is formed by providing a top platform having a side that extends beyond the opposing side of the bottom platform, so that extending the mounting support downward from the extended side of the top platform resulting in said gap.

A6. The cross blade flexure pivot according to A3, wherein the mounting support further comprises a post that extends outward from the outward surface of the mounting support.

A7. The cross blade flexure pivot according to A6, wherein the post is aligned with the axis of rotation formed by the intersection of the pair of crossing flat flexure elements.

A8. The cross blade flexure pivot according to A3, wherein the mounting support further comprises a hole for inserting a separate post therethrough for mounting purposes, said hole being disposed in a position aligned with the axis of rotation formed by the intersection of the pair of crossing flat flexure elements.

A9. The cross blade flexure pivot according to A1, wherein said monolithic structure comprises one pair of crossing flat flexure elements.

A10. The cross blade flexure pivot according to claim 1, wherein said monolithic structure comprises more than one pair of crossing flat flexure elements.

A11. The cross blade flexure pivot according to A1 further comprising:
 a third flexure element that is substantially the same as the first flexure element in structure and orientation, said second flexure element being disposed between the first and third flexure elements.

A12. The cross blade flexure pivot according to A1, wherein said monolithic structure comprises a plastic composition.

A13. The cross blade flexure pivot according to A12, wherein said plastic composition is selected from the group consisting of DuPont Zytel, Delrin, Schulatec, Ryton, Vespel, polypropylene, nylon, Torlon, and the like.

A14. The cross blade flexure pivot according to A1, wherein said monolithic structure comprises a metallic composition.

A15. The cross blade flexure pivot according to A14, wherein said metallic composition is selected from the group consisting of stainless steel, titanium, aluminum, carbon steel, nickel alloys, beryllium copper, and the like.

B1. A method for preparing a monolithic cross blade flexure pivot, said method comprising:
 providing a mold configured to form, by injection molding, the cross blade flexure pivot according to any one of A1-A15; and
 injecting molding material into the mold under conditions effective to yield the monolithic cross blade flexure pivot.

B2. The method according to B1, wherein the molding material is a plastic composition and the injecting step comprises plastic injection molding.

B3. The method according to B2, wherein said plastic composition is selected from the group consisting of DuPont Zytel, Delrin, Schulatec, Ryton, Vespel, polypropylene, nylon, Torlon, and the like.

B4. The method according to B1, wherein the molding material is a metallic composition and the injecting step comprises metal injection molding.

B5. The method according to B4, wherein said metallic composition is selected from the group consisting of stainless steel, titanium, aluminum, carbon steel, nickel alloys, beryllium copper, and the like.

C1. A mold for preparing, by injection molding techniques, a cross blade flexure pivot according to any one of A1-A15.

D1. A method for preparing a monolithic cross blade flexure pivot, said method comprising:
 providing a three-dimensional digital description of the monolithic cross blade flexure pivot according to any one of A1-A15; and
 performing selective laser sintering (SLS) to produce the monolithic cross blade flexure pivot according to said three-dimensional digital description.

D2. The method according to D1, wherein the selective laser sintering uses plastic particles to produce a monolithic cross blade flexure pivot that comprises a plastic composition.

D3. The method according to D2, wherein said plastic composition is selected from the group consisting of DuPont Zytel, Delrin, Schulatec, Ryton, Vespel, polypropylene, nylon, Torlon, and the like.

D4. The method according to D1, wherein the selective laser sintering uses metallic particles to produce a monolithic cross blade flexure pivot that comprises a metallic composition.

D5. The method according to D4, wherein said metallic composition is selected from the group consisting of stainless steel, titanium, aluminum, carbon steel, nickel alloys, beryllium copper, and the like.

E1. A three-dimensional digital description that is effective for use in producing, by selective laser sintering (SLS), a monolithic cross blade flexure pivot according to any one of A1-A15.

F1. A method of providing non-frictional rotational support to a mechanical component, said method comprising:
 providing a monolithic cross blade flexure pivot according to any one of A1-A15; and
 functionally mounting the monolithic cross blade flexure pivot to a mechanical component so that the mechanical component pivots from a starting position to an ending position in response to an applied force, and then returns to the starting position due to reverse torsional spring force generated by the monolithic cross blade flexure pivot.

F2. The method according to F1, wherein said mechanical component is effective for a use selected from the group consisting of switching mechanisms, oscillating mirror platforms, weigh scales, computer disc drive pickup arm supports, gimbal mount supports, gaging systems, balance beams, and the like.

G1. A system comprising a monolithic cross blade flexure pivot according to any one of A1-A15 coupled to at least one mechanical component functionally coupled to the device.

G2. The system according to G1, wherein said mechanical component is effective for a use selected from the group consisting of switching mechanisms, oscillating mirror platforms, weigh scales, computer disc drive pickup arm supports, gimbal mount supports, gaging systems, balance beams, and the like.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A cross blade flexure pivot comprising a monolithic structure, said monolithic structure comprising:
   a top platform and a bottom platform, each of which has an inner surface, wherein the inner surface of the top platform and the inner surface of the bottom platform face one another and are substantially parallel to one another; and
   at least one pair of crossing flat flexure elements that function as springs and that intersect independent of one another to provide an axis of rotation for the top and bottom platforms along a projected line that extends through the intersection of the pair of crossing flat flexure elements,
   wherein a first flexure element of the pair of flexure elements extends from a first end of the inner surface of the top platform to an opposite second end of the inner surface of the bottom platform, and
   wherein a second flexure element of the pair of flexure elements extends from a second end of the inner surface of the top platform to an opposite first end of the inner surface of the bottom platform.

2. The cross blade flexure pivot according to claim 1, wherein an angle formed between a central plane of either the top or bottom platform and a central plane of either the first or second flexure element is an angle of greater than 0 degrees and less than 90 degrees.

3. The cross blade flexure pivot according to claim 1 further comprising:
   a mounting support comprising a projection that extends downward from a side of the top platform so that the inner surface of the mounting support faces the axis of rotation formed by the intersection of the pair of crossing flat flexure elements, and so that the projection extends at least beyond the axis of rotation.

4. The cross blade flexure pivot according to claim 3, wherein the inner surface of the mounting support is disposed a distance from the nearest flat flexure element so as to form a gap therebetween.

5. The cross blade flexure pivot according to claim 4, wherein the gap is formed by providing a top platform having a side that extends beyond the opposing side of the bottom platform, so that extending the mounting support downward from the extended side of the top platform resulting in said gap.

6. The cross blade flexure pivot according to claim 3, wherein the mounting support further comprises a post that extends outward from the outward surface of the mounting support.

7. The cross blade flexure pivot according to claim 6, wherein the post is aligned with the axis of rotation formed by the intersection of the pair of crossing flat flexure elements.

8. The cross blade flexure pivot according to claim 3, wherein the mounting support further comprises a hole for inserting a separate post therethrough for mounting purposes, said hole being disposed in a position aligned with the axis of rotation formed by the intersection of the pair of crossing flat flexure elements.

9. The cross blade flexure pivot according to claim 1, wherein said monolithic structure comprises one pair of crossing flat flexure elements.

10. The cross blade flexure pivot according to claim 1, wherein said monolithic structure comprises more than one pair of crossing flat flexure elements.

11. The cross blade flexure pivot according to claim 1 further comprising:
    a third flexure element that is substantially the same as the first flexure element in structure and orientation, said second flexure element being disposed between the first and third flexure elements.

12. The cross blade flexure pivot according to claim 1, wherein said monolithic structure comprises a plastic composition.

13. The cross blade flexure pivot according to claim 12, wherein said plastic composition is selected from the group consisting of nylon resin, homopolymer resin, plastic, polyphenylene sulfide, polyimide, polypropylene, nylon, and polyamide-imide.

14. The cross blade flexure pivot according to claim 1, wherein said monolithic structure comprises a metallic composition.

15. The cross blade flexure pivot according to claim 14, wherein said metallic composition is selected from the group consisting of stainless steel, titanium, aluminum, carbon steel, nickel alloys, and beryllium copper.

16. A method for preparing a monolithic cross blade flexure pivot, said method comprising:
    providing a mold configured to form, by injection molding, the cross blade flexure pivot according to claim 1; and
    injecting molding material into the mold under conditions effective to yield the monolithic cross blade flexure pivot.

17. A mold for preparing, by injection molding techniques, a cross blade flexure pivot according claim 1.

18. A method for preparing a monolithic cross blade flexure pivot, said method comprising:
    providing a three-dimensional digital description of the monolithic cross blade flexure pivot according to claim 1; and
    performing selective laser sintering (SLS) to produce the monolithic cross blade flexure pivot according to said three-dimensional digital description.

19. A three-dimensional digital description that is effective for use in producing, by selective laser sintering (SLS), a monolithic cross blade flexure pivot according to claim 1.

20. A method of providing non-frictional rotational support to a mechanical component, said method comprising:
    providing a monolithic cross blade flexure pivot according to claim 1; and
    functionally mounting the monolithic cross blade flexure pivot to a mechanical component so that the mechanical component pivots from a starting position to an ending position in response to an applied force, and then returns to the starting position due to reverse torsional spring force generated by the monolithic cross blade flexure pivot.

21. A system comprising a monolithic cross blade flexure pivot according to claim 1 coupled to at least one mechanical component functionally coupled to the pivot.

* * * * *